(12) United States Patent
Fujita et al.

(10) Patent No.: US 11,022,130 B2
(45) Date of Patent: Jun. 1, 2021

(54) TURBOCHARGER

(71) Applicant: MITSUBISHI HEAVY INDUSTRIES ENGINE & TURBOCHARGER, LTD., Sagamihara (JP)

(72) Inventors: Yutaka Fujita, Tokyo (JP); Takao Yokoyama, Tokyo (JP); Seiichi Ibaraki, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 100 days.

(21) Appl. No.: 16/088,587

(22) PCT Filed: Mar. 30, 2016

(86) PCT No.: PCT/JP2016/060356
§ 371 (c)(1),
(2) Date: Sep. 26, 2018

(87) PCT Pub. No.: WO2017/168626
PCT Pub. Date: Oct. 5, 2017

(65) Prior Publication Data
US 2019/0154043 A1    May 23, 2019

(51) Int. Cl.
*F04D 29/051* (2006.01)
*F04D 25/04* (2006.01)
(Continued)

(52) U.S. Cl.
CPC ............ *F04D 25/045* (2013.01); *F01D 3/00* (2013.01); *F02B 37/00* (2013.01); *F02B 39/00* (2013.01);
(Continued)

(58) Field of Classification Search
CPC .... F04D 29/041; F04D 29/051; F04D 29/063; F04D 29/662; F04D 39/051; F04D 25/024; F02B 39/00; F02B 37/00; F01D 3/00–04
(Continued)

(56) References Cited

U.S. PATENT DOCUMENTS 3,966,351 A * 6/1976 Sproule .................... F01D 11/04
415/110
4,472,107 A * 9/1984 Chang .................... F04D 29/162
415/104
(Continued)

FOREIGN PATENT DOCUMENTS

CN  1086876 A   5/1994
CN  1248667 A   3/2000
(Continued)

OTHER PUBLICATIONS

DE-102004041439—Translation (Year: 2006).*
(Continued)

*Primary Examiner* — Woody A Lee, Jr.
*Assistant Examiner* — Behnoush Haghighian
(74) *Attorney, Agent, or Firm* — Birch, Stewart, Kolasch & Birch, LLP.

(57) ABSTRACT

This turbocharger (1A) is provided with: a rotating shaft (4); a turbine wheel (2); a compressor wheel (3); a bearing housing (6) provided with journal bearings (5A, 5B) for rotatably supporting a shaft (4), and a thrust bearing (8) for supporting the rotating shaft (4) in the center axis (C) direction thereof; and a turbine housing (31) in which the turbine wheel (2) is accommodated. A fluid supply section (70A) for supplying a fluid to the turbine wheel (2) is provided within the turbine housing (31) and said fluid presses the turbine wheel (2) toward a first end (4a) side.

1 Claim, 3 Drawing Sheets

(51) Int. Cl.
*F02B 37/00* (2006.01)
*F02B 39/00* (2006.01)
*F01D 3/00* (2006.01)
*F04D 25/02* (2006.01)
*F04D 29/063* (2006.01)
*F04D 29/66* (2006.01)
*F04D 29/041* (2006.01)

(52) U.S. Cl.
CPC ......... *F04D 25/024* (2013.01); *F04D 29/051* (2013.01); *F04D 29/063* (2013.01); *F04D 29/041* (2013.01); *F04D 29/662* (2013.01); *F05D 2220/40* (2013.01); *F05D 2260/98* (2013.01); *Y02T 10/12* (2013.01)

(58) Field of Classification Search
USPC .................................................. 417/365, 403
See application file for complete search history.

(56) References Cited

U.S. PATENT DOCUMENTS

| | | | | |
|---|---|---|---|---|
| 5,094,587 | A * | 3/1992 | Woollenweber | F01D 9/026 415/205 |
| 5,248,239 | A * | 9/1993 | Andrews | F01D 3/00 415/104 |
| 6,032,466 | A * | 3/2000 | Woollenweber | F01D 25/164 417/407 |
| 6,231,302 | B1 * | 5/2001 | Bonardi | F01D 25/22 415/105 |
| 6,543,994 | B2 * | 4/2003 | Jinnai | F01D 17/165 415/150 |
| 7,108,488 | B2 * | 9/2006 | Larue | F16C 17/024 384/103 |
| 7,530,230 | B2 * | 5/2009 | Shibui | F02B 37/04 290/52 |
| 7,723,883 | B2 * | 5/2010 | Ozaki | F01D 15/005 310/90.5 |
| 8,347,648 | B2 * | 1/2013 | Nakazeki | F01D 15/005 62/402 |
| 8,814,499 | B2 * | 8/2014 | Kim | F04D 29/0513 415/58.4 |
| 8,882,458 | B2 * | 11/2014 | Knoop | F04D 25/04 415/229 |
| 9,133,725 | B2 * | 9/2015 | Wiebe | F01D 11/02 |
| 9,677,463 | B2 * | 6/2017 | Takata | F01D 11/04 |
| 10,526,960 | B2 * | 1/2020 | Kojima | F02B 39/00 |
| 10,598,014 | B2 * | 3/2020 | Wengert | F02C 6/12 |
| 2001/0017032 | A1 * | 8/2001 | Jinnai | F02B 37/24 60/605.2 |
| 2014/0017099 | A1 * | 1/2014 | Rodriguez Erdmenger | F04D 29/051 417/244 |
| 2015/0369474 | A1 | 12/2015 | Nakano et al. | |
| 2017/0122339 | A1 * | 5/2017 | Sun | F04D 29/051 |
| 2018/0094542 | A1 * | 4/2018 | Lucas | F01D 25/18 |

FOREIGN PATENT DOCUMENTS

| | | | |
|---|---|---|---|
| CN | 104969002 A | 10/2015 | |
| DE | 198 40 098 A1 | 3/2000 | |
| DE | 102004041439 A1 * | 3/2006 | ............. F01D 11/00 |
| DE | 10 2008 027 517 A1 | 12/2009 | |
| JP | 55-15606 B2 | 4/1980 | |
| JP | 57-171101 U | 10/1982 | |
| JP | 59-56333 U | 4/1984 | |
| JP | 61-112737 A | 5/1986 | |
| JP | 6-159084 A | 6/1994 | |
| JP | 2001-200727 A | 7/2001 | |
| JP | 2014-234713 A | 12/2014 | |
| WO | WO 2014/000867 A1 | 1/2014 | |

OTHER PUBLICATIONS

International Preliminary Report on Patentability (forms PCT/IPEA/409 and PCT/IPEA/416), dated Mar. 16, 2018, for International Application No. PCT/JP2016/060356, with an English translation.
International Search Report (form PCT/ISA/210), dated May 24, 2016, for International Application No. PCT/JP2016/060356, with an English translation.
International Preliminary Report on Patentability (forms PCT/IPEA/409 and PCT/IPEA/416), dated Mar. 27, 2018, for International Application No. PCT/JP2016/060356, with an English translation.

* cited by examiner

TURBOCHARGER

TECHNICAL FIELD

The present invention relates to a turbocharger.

BACKGROUND ART

In a turbocharger, reduction of losses in a bearing housing is implemented in order to improve the efficiency. Also, in this turbocharger, a phenomenon in which part of the air compressed by a compressor wheel leaks to a back surface side of the compressor wheel is found.

If the compressed air leaks to the back side of the compressor wheel as mentioned above, the compressor wheel is pressed in a center axis direction (the thrust direction) of a rotating shaft, so that the resistance in a thrust bearing which supports the load in the thrust direction of the rotating shaft (thrust load) increases, which impedes the improvement of the supercharging efficiency of the turbocharger.

Patent Literature 1 discloses a technique in which labyrinth seals are provided at two places in a back air chamber of an impeller in order to reduce the thrust load during low speed rotation, and an air extraction port for communicating with the atmosphere is provided in the back air chamber, thereby decreasing the pressure of the back air chamber.

CITATION LIST

Patent Literature

[Patent Literature 1]
Japanese Unexamined Patent Application, First Publication No. S61-112737

SUMMARY OF INVENTION

Technical Problem

Although Patent Literature 1 can reduce the thrust load during low speed rotation, the thrust load cannot be reduced at all operating points. Even when the turbocharger is operating in a fast rotation range, the thrust load for pressing the compressor wheel in the thrust direction is also increased by the back pressure of the compressor wheel.

On the other hand, there is a case in the turbocharger in which an outer diameter of the compressor wheel becomes larger than an outer diameter of a turbine wheel in order to achieve high performance such as a wide range, etc. For example, if the outer diameter of the compressor wheel is made larger than the outer diameter of the turbine wheel, the thrust load for pressing the compressor wheel in the thrust direction by the pressure (back pressure) due to the air leaked to the back side of the compressor wheel also becomes larger.

In this way, as the performance of the turbocharger becomes better, the influence of the increase of the resistance at the thrust bearing due to the back pressure of the compressor wheel becomes more significant.

It is an object of the present invention to provide a turbocharger capable of reducing the thrust load caused by the back pressure of the compressor wheel and increasing the supercharging efficiency.

Solution to Problem

According to a first aspect of the present invention, a turbocharger includes a rotating shaft which extends along a center axis, a turbine wheel which is provided on a first end side of the rotating shaft, and a compressor wheel which is provided on a second end side of the rotating shaft. The turbocharger further includes a bearing housing which includes a radial bearing for rotatably supporting the rotating shaft and a thrust bearing for supporting the rotating shaft in the center axis direction, and a turbine housing which receives the turbine wheel. The turbocharger further includes a fluid supply section for supplying a fluid which presses the turbine wheel toward the first end side to the turbine wheel in the turbine housing.

With this configuration, the fluid supply section can supply the fluid which presses the turbine wheel toward the first end side opposite to the compressor wheel with respect to the turbine wheel. The force with which the turbine wheel is pressed toward the first end side is opposite to the force pressing the compressor toward the second end side by the back pressure of the compressor wheel. Therefore, the thrust load resulting from the compressor back pressure can be reduced.

According to a second aspect of the present invention, the turbocharger may be configured such that the fluid supply section according to the first aspect extracts a gas from an upstream side of the turbine wheel in a flow direction of the gas supplied to the turbine wheel and supplies the gas to a back surface of the turbine wheel on the second end side.

In this way, the gas on the upstream side of the turbine wheel is higher in pressure than the gas after working of rotating the turbine wheel. Thus, by supplying the gas to the back surface of the turbine wheel, it is possible to efficiently exert the force which presses the turbine wheel toward the first end side.

According to a third aspect of the present invention, the turbocharger may be configured such that, in the first aspect, the fluid supply section extracts the fluid from a space formed between the compressor wheel and the bearing housing and supplies the fluid to the back surface of the turbine wheel on the second end side.

In this way, the space formed between the compressor wheel and the bearing housing, that is, the fluid which forms the back pressure of the compressor wheel, is extracted and supplied to the back surface of the turbine wheel. This makes it possible to press the turbine wheel while reducing the back pressure of the compressor wheel.

According to a fourth aspect of the present invention, the turbocharger may be configured such that, in any one of the first to third aspects, the bearing housing has a lubricating oil feed path for supplying lubricating oil to at least the radial bearing, and the fluid supply section is provided along the lubricating oil feed path in the bearing housing.

With this, the lubricating oil can be heated by the heat of the fluid supplied to the turbine wheel, so that the viscosity can be lowered. As a result, the sliding resistance in the radial bearing or the like that supports the rotating shaft is reduced.

Advantageous Effects of Invention

According to the turbocharger described above, the thrust load caused by the back pressure of the compressor wheel can be reduced and the supercharging efficiency can be increased.

DESCRIPTION OF EMBODIMENTS

A turbocharger according to an embodiment of the present invention will be described based on the drawings.

First Embodiment

Figure 1:
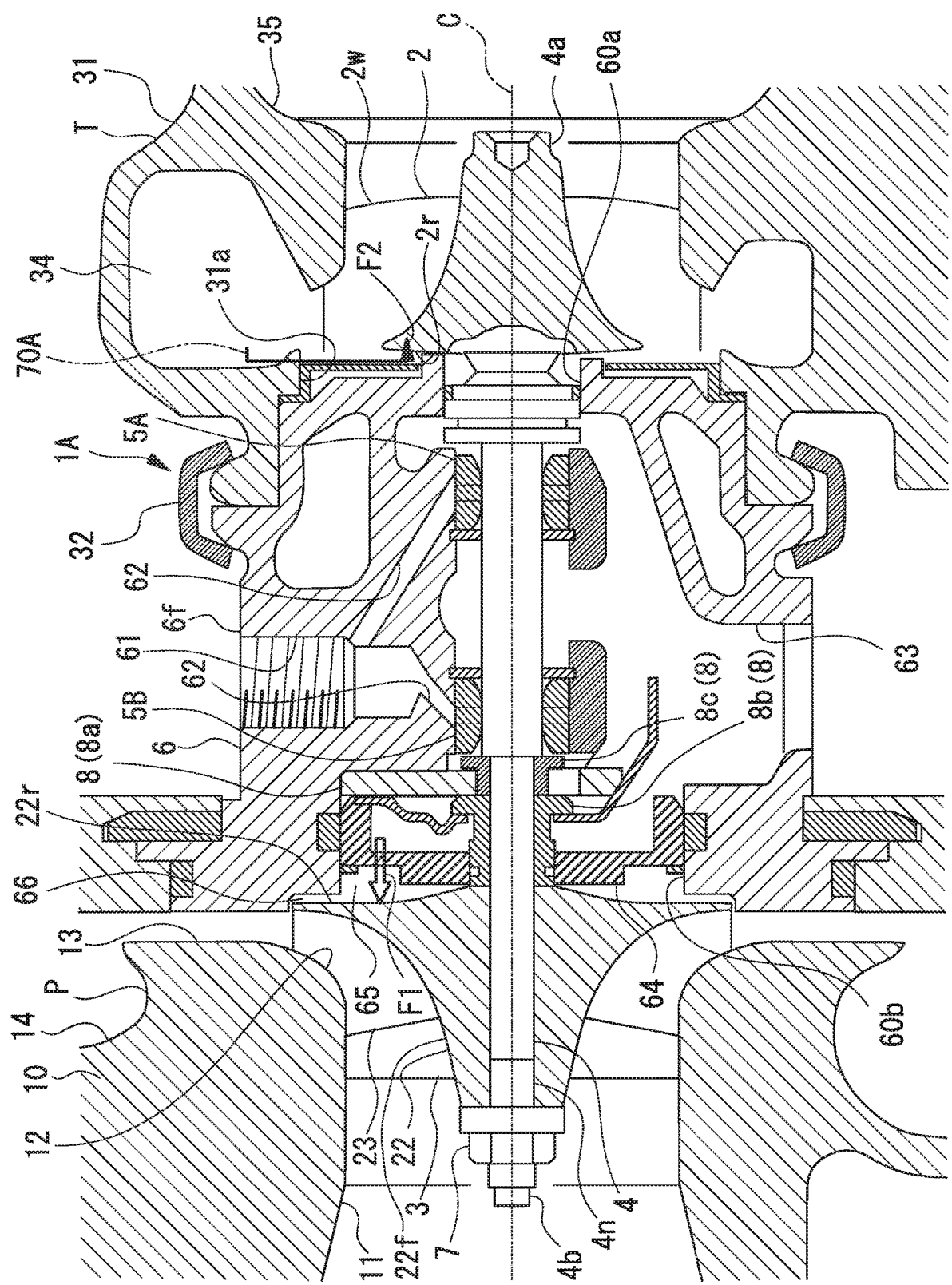
FIG. 1 is a cross-sectional view of a turbocharger in a first embodiment of the present invention.

FIG. 1 is a cross-sectional view of a turbocharger according to a first embodiment of the present invention.

As shown in FIG. 1, a turbocharger 1A includes a turbine wheel 2, a compressor wheel 3, a rotating shaft 4, journal bearings (radial bearings) 5A and 5B, a thrust bearing 8, and a bearing housing 6. This turbocharger 1A is mounted, for example, in an automobile or the like as an auxiliary machine of an engine in a posture in which the rotating shaft 4 extends in a horizontal direction. Here, the dashed line shown in FIG. 1 indicates a center axis C of the rotating shaft 4.

The bearing housing 6 is supported by a vehicle body or the like via a bracket (not shown), a compressor P, a turbine T, and the like. The bearing housing 6 has an opening 60a at one end thereof and an opening 60b at the other end thereof.

The rotating shaft 4 supports a load in a radial direction perpendicular to the center axis C with the journal bearings 5A and 5B held by the bearing housing 6, and are supported to be rotatable around the center axis C.

Also, the rotating shaft 4 supports a thrust load in a direction along the center axis C with the thrust bearing 8 provided in the bearing housing 6. The thrust bearing 8 is fixed to the bearing housing 6, and includes a bearing main body 8a disposed in a plane orthogonal to the center axis C, and a thrust sleeve 8b and a thrust ring 8c which are mounted on the rotating shaft 4 and abut against one surface side and the other surface side of the bearing main body 8a in the center axis C direction, respectively.

The bearing housing 6 has an oil feed pipe connection port 61 which extends radially inward of the bearing housing 6 from an outer circumferential surface 6f of the bearing housing 6. A lubricating oil feed pipe (not shown) for feeding lubricating oil from an outside of the bearing housing 6 is connected to the oil feed pipe connection port 61.

The lubricating oil fed from the lubricating oil feed pipe into the oil feed pipe connection port 61 is supplied to the journal bearings 5A and 5B and the like inside the bearing housing 6 via a lubricating oil feed path 62 formed in the bearing housing 6. An oil drain portion 63 for draining the lubricating oil supplied to the journal bearings 5A and 5B, etc., is formed in a lower portion of the bearing housing 6. A pipe (not shown) for draining the lubricating oil is connected to the oil drain portion 63.

A first end 4a and a second end 4b of the rotating shaft 4 protrude to the outside of the bearing housing 6 through the openings 60a and 60b, respectively. That is, part of the rotating shaft 4 in a longitudinal direction along the center axis C is accommodated in the bearing housing 6.

The turbine T is provided on one end side of the bearing housing 6. The turbine T includes a turbine wheel 2 and a turbine housing 31 for receiving the turbine wheel 2.

The turbine wheel 2 is provided integrally with the first end 4a of the rotating shaft 4 and rotates around the center axis C integrally with the rotating shaft 4. The turbine wheel 2 has a plurality of turbine blades 2w in a circumferential direction.

The turbine housing 31 is attached to one end side of the bearing housing 6 via a mounting fixture 32. The turbine housing 31 has an opening 31a at a position facing the bearing housing 6. The turbine wheel 2 is accommodated in the opening 31a.

The turbine housing 31 includes a gas introduction portion (not shown), a scroll flow passage 34, and an exhaust portion 35.

The gas introduction portion (not shown) feeds part of an exhaust gas discharged from the engine (not shown) into the turbine housing 31.

The scroll flow passage 34 is continuous with the gas introduction portion (not shown) and is continuously formed in the circumferential direction to surround an outer peripheral side of the turbine wheel 2. The scroll flow passage 34 is provided to face an outer peripheral portion of the turbine wheel 2 at least in a part thereof in the circumferential direction and forms a flow passage through which the exhaust gas for rotationally driving the turbine wheel 2 flows.

The exhaust gas flowing thereinto from the gas introduction portion 33 flows along the outer peripheral side of the turbine wheel 2 along the scroll flow passage 34 in the circumferential direction. The exhaust gas flowing in the circumferential direction as mentioned above strikes the turbine blades 2w of the turbine wheel 2, thereby rotationally driving the turbine wheel 2. Further, the flow direction of the exhaust gas is changed by hitting each of the turbine blades 2w on the outer peripheral side of the turbine wheel 2. The exhaust gas whose flow direction is changed by the turbine blades 2w is discharged into the exhaust portion 35 from an inner peripheral side of the turbine wheel 2.

The compressor P is provided on the other end side of the bearing housing 6. The compressor P includes a compressor wheel 3 and a compressor casing 10.

The compressor wheel 3 includes a disk 22 and blades 23.

The disk 22 has a fixed length in the center axis C direction and is fixed to the second end 4b of the rotating shaft 4. The disk 22 has a disk surface 22f on the second end 4b side of the rotating shaft 4. The disk surface 22f is formed by a curved surface which expands gradually outward in the radial direction as it goes from the second end 4b side of the rotating shaft 4 toward the bearing housing 6 side.

A plurality of blades 23 are provided on the disk surface 22f at intervals in the circumferential direction around the center axis C.

The compressor wheel 3 is sandwiched between the thrust sleeve 8b and a nut 7 by screwing the nut 7 into a threaded portion 4n formed at the second end 4b of the rotating shaft 4 to be coupled to the rotating shaft 4.

This compressor wheel 3 rotates around the center axis C integrally with the rotating shaft 4 when the turbine wheel 2 rotates. The compressor wheel 3 raises the temperature and pressure of the air (intake air) with the blades 23 and discharges the compressed air outward in the radial direction.

The compressor casing 10 forms a wheel inlet flow passage 11, a wheel flow passage 12, a diffuser 13, and a scroll 14.

The wheel inlet flow passage 11 is formed, for example, between an intake pipe (not shown) extending from an air cleaner box and the like and the wheel flow passage 12. The wheel flow passage 12 is formed by a space for accommodating the compressor wheel 3. This wheel flow passage 12 forms a flow path for the compressed air to flow between the wheel flow passage 12 and the disk 22 of the compressor wheel 3.

The diffuser 13 extends from an outermost peripheral portion 12a of the wheel flow passage 12 outward in the radial direction with the center axis C as a center. This diffuser 13 converts, for example, kinetic energy of the air compressed by the compressor wheel 3 into pressure energy. This diffuser 13 allows communication between the wheel inlet flow passage 11 and the scroll 14.

The scroll 14 further converts kinetic energy of the intake air flowing in from the diffuser 13 into pressure energy and discharges it to the outside of the compressor casing 10. The air discharged through the scroll 14 is supplied to a cylinder or the like of the engine (not shown). The scroll 14 extends in the circumferential direction with the center axis C as a center. The cross-sectional area of the scroll 14 thus formed gradually enlarges toward an outlet (not shown) of the compressor P.

In the turbocharger 1A described above, a back plate 64 which closes a space between the opening 60b of the bearing housing 6 and the thrust ring 8c is provided on the first end 4a side (the right side in FIG. 1) of the rotating shaft 4 with respect to the compressor wheel 3.

A space 65 is formed between a back surface 22r which is on the first end 4a side of the rotating shaft 4 with respect to the disk 22 of the compressor wheel 3 and the back plate 64. The compressed air flows into the space 65 from the disk surface 22f side of the disk 22 of the compressor wheel 3 through a gap 66 between the outer peripheral portion of the compressor wheel 3 and the bearing housing 6. The compressor wheel 3 is pressed toward the second end 4b side of the rotating shaft 4 (the right side in FIG. 1) by the thrust force F1 due to the pressure of the compressed air flowing into the space 65.

In this embodiment, in order to balance the thrust force F1 acting on the compressor wheel 3, a fluid supply section 70A for supplying a fluid which presses the turbine wheel 2 toward the first end 4a side of the rotating shaft 4 is provided.

The fluid supply section 70A extracts the high pressure exhaust gas from an upstream side of the turbine wheel 2 in the flow direction of the exhaust gas in the turbine T, for example, from the scroll flow passage 34, and supplies it to a back surface 2r which is on the second end 4b side (the left side in FIG. 1) of the rotating shaft 4 in the turbine wheel 2.

The fluid supply section 70A may be provided with a flow path hole for the exhaust gas or may be provided with a pipe or the like that becomes a flow path for the exhaust gas in the turbine housing 31.

By supplying the high pressure exhaust gas from the upstream side of the turbine wheel 2 to the back surface 2r in the fluid supply section 70A, a pressing force F2 for pressing the turbine wheel 2 toward the first end 4a side (the right side in FIG. 1) of the rotating shaft 4 acts on the turbine wheel 2.

According to the turbocharger 1A of the first embodiment described above, with respect to the turbine wheel 2, the fluid supply section 70A supplies the fluid that presses the turbine wheel 2 toward the first end 4a side which is opposite to the compressor wheel 3. The force with which the turbine wheel 2 is pressed toward the first end 4a side is opposite to the force pressing the compressor wheel 3 toward the second end 4b side by the back pressure of the compressor wheel 3. Thereby, the thrust load caused by the back pressure of the compressor P can be reduced. As a result, the supercharging efficiency of the turbocharger 1A can be increased.

In addition, the fluid supply section 70A is formed to extract gas from the upstream side of the turbine wheel 2 in the flow direction of the gas supplied to the turbine wheel 2. Since the gas on the upstream side of the turbine wheel 2 has a high pressure, supplying this high pressure gas to the back surface 2r of the turbine wheel 2 can make the force pressing the turbine wheel 2 toward the first end 4a side efficiently work.

Here, in the turbine wheel 2, the exhaust gas flowing on the side where the turbine blades 2w are provided (the first end 4a side of the rotating shaft 4) performs work for rotating the turbine wheel 2, so that the energy amount thereof decreases and the pressure thereof drops as well. Therefore, a differential pressure is generated between the high pressure exhaust gas supplied to the back surface 2r side of the turbine wheel 2 and the opposite side (the first end 4a side of the rotating shaft 4). Thereby, it is possible to more effectively exert the pressing force F2 imparted by the exhaust gas supplied to the back surface 2r side.

Second Embodiment

Next, a turbocharger according to a second embodiment of the present invention will be described. This turbocharger shown in the second embodiment is different only in the configuration of the fluid supply section from the turbocharger according to the first embodiment. Therefore, in the description of the second embodiment, parts the same as those of the first embodiment are denoted by the same reference numerals, and redundant explanation will be omitted. That is, the description of the overall configuration of the turbocharger that is to the same as the configuration described in the first embodiment will be omitted.

Figure 2:
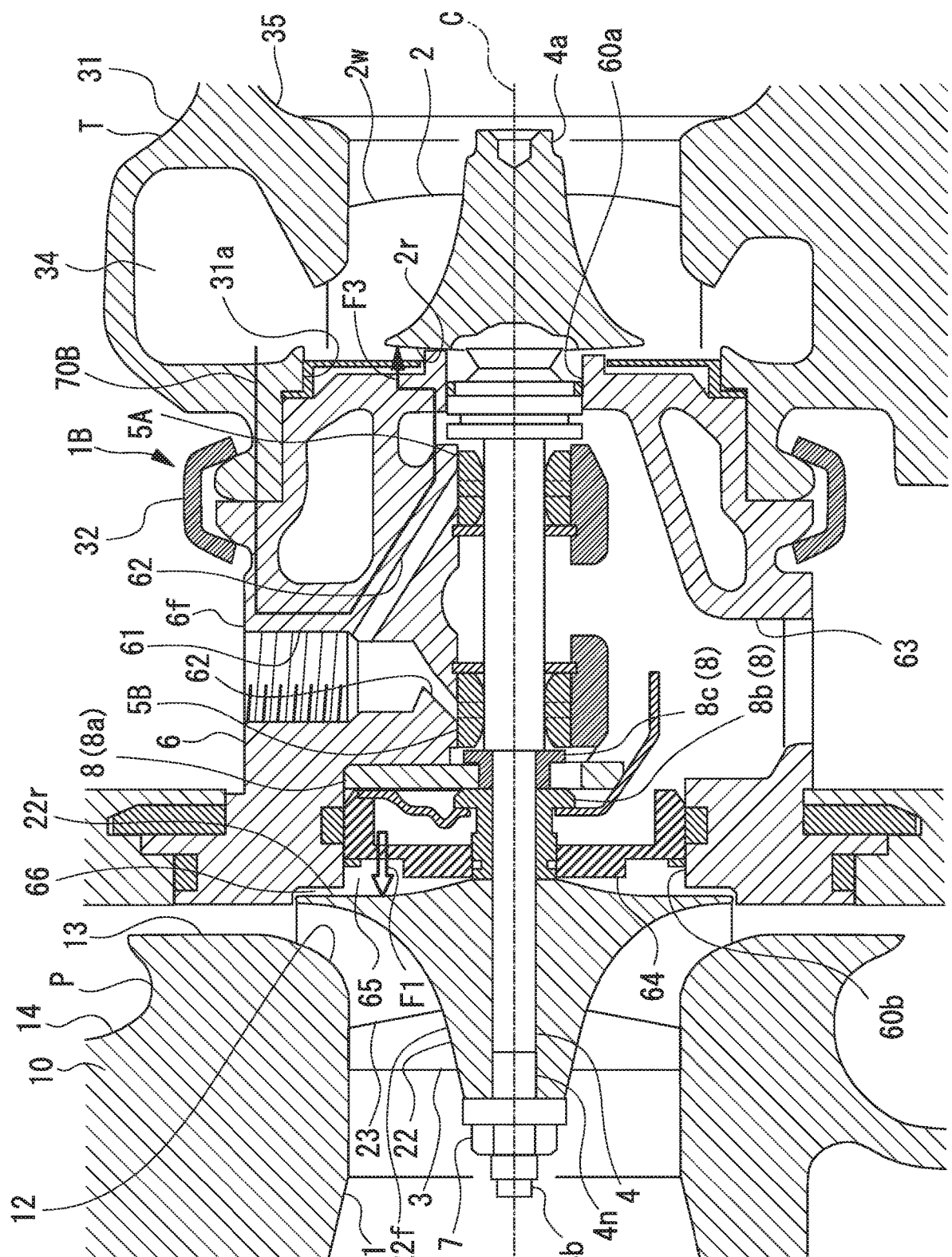
FIG. 2 is a cross-sectional view of a turbocharger according to a second embodiment of the present invention.

FIG. 2 is a cross-sectional view of the turbocharger according to the second embodiment of the present invention.

As shown in FIG. 2, in order to balance with the thrust force F1 acting on the compressor wheel 3, the turbocharger 1B in the second embodiment has a fluid supply section 70B for supplying a fluid which presses the turbine wheel 2 to the first end 4a side of the rotating shaft 4 (the right side in FIG. 1).

The fluid supply section 70B extracts the high pressure exhaust gas from the upstream side of the turbine wheel 2 in the flow direction of the exhaust gas in the turbine T, for example, from the scroll flow passage 34, and supplies it to the back surface 2r on the second end 4b side of the rotating shaft 4 in the turbine wheel 2 (the left side in FIG. 1).

The fluid supply section 70B passes through the bearing housing 6 and at least part thereof in the longitudinal direction is provided along the lubricating oil feed path 62.

The fluid supply section 70B mentioned above may be provided with a hole serving as a flow path for the exhaust gas or may be provided with a pipe or the like serving as a flow path for the exhaust gas, in the turbine housing 31 or the bearing housing 6.

By supplying the high-pressure exhaust gas from the upstream side of the turbine wheel 2 to the back surface 2r in the fluid supply section 70B, a pressing force F3 for pressing the turbine wheel 2 toward the first end 4a side of the rotating shaft 4 (the right side in FIG. 1) is applied to the turbine wheel 2.

Further, the fluid supply section 70B takes the high temperature exhaust gas therein and heats the lubricating oil flowing through the lubricating oil feed path 62 using the heat.

In the turbocharger 1B of this embodiment, the lubricating oil can be heated using the heat of the fluid which is supplied to the turbine wheel 2 by the fluid supply section 70B, so that the viscosity thereof can be lowered. This reduces the sliding resistance of the journal bearings 5A and 5B that support the rotating shaft 4, thereby making it possible to increase the supercharging efficiency of the turbocharger 1B.

In addition, the temperature of the exhaust gas supplied to the turbine wheel 2 by the fluid supply section 70B is lowered by heating the lubricating oil in the bearing housing 6. By supplying the exhaust gas with a thus reduced temperature to the back surface 2r side of the turbine wheel 2, thermal damage on the members near the back surface 2r of the turbine wheel 2 can be minimized.

Furthermore, in the same way as in the first embodiment, the fluid supply section 70B supplies the fluid that presses the turbine wheel 2 toward the first end 4a side which is opposite to the compressor wheel 3 side to the turbine wheel 2. Thus, the thrust load due to the back pressure of the compressor P can be reduced. As a result, it is possible to increase the supercharging efficiency of the turbocharger 1B.

Third Embodiment

Next, a turbocharger according to a third embodiment of the present invention will be described. This turbocharger of the third embodiment is different only in the configuration of the fluid supply section from the turbocharger of the first and second embodiments. Therefore, in the description of the third embodiment, the same reference numerals are assigned to the same parts and repeated description will be omitted. In other words, the differences compared to the first and second embodiments will be mainly described and the description of the overall configuration of the turbocharger which is the same as the configurations described in the first and second embodiments will be omitted.

Figure 3:
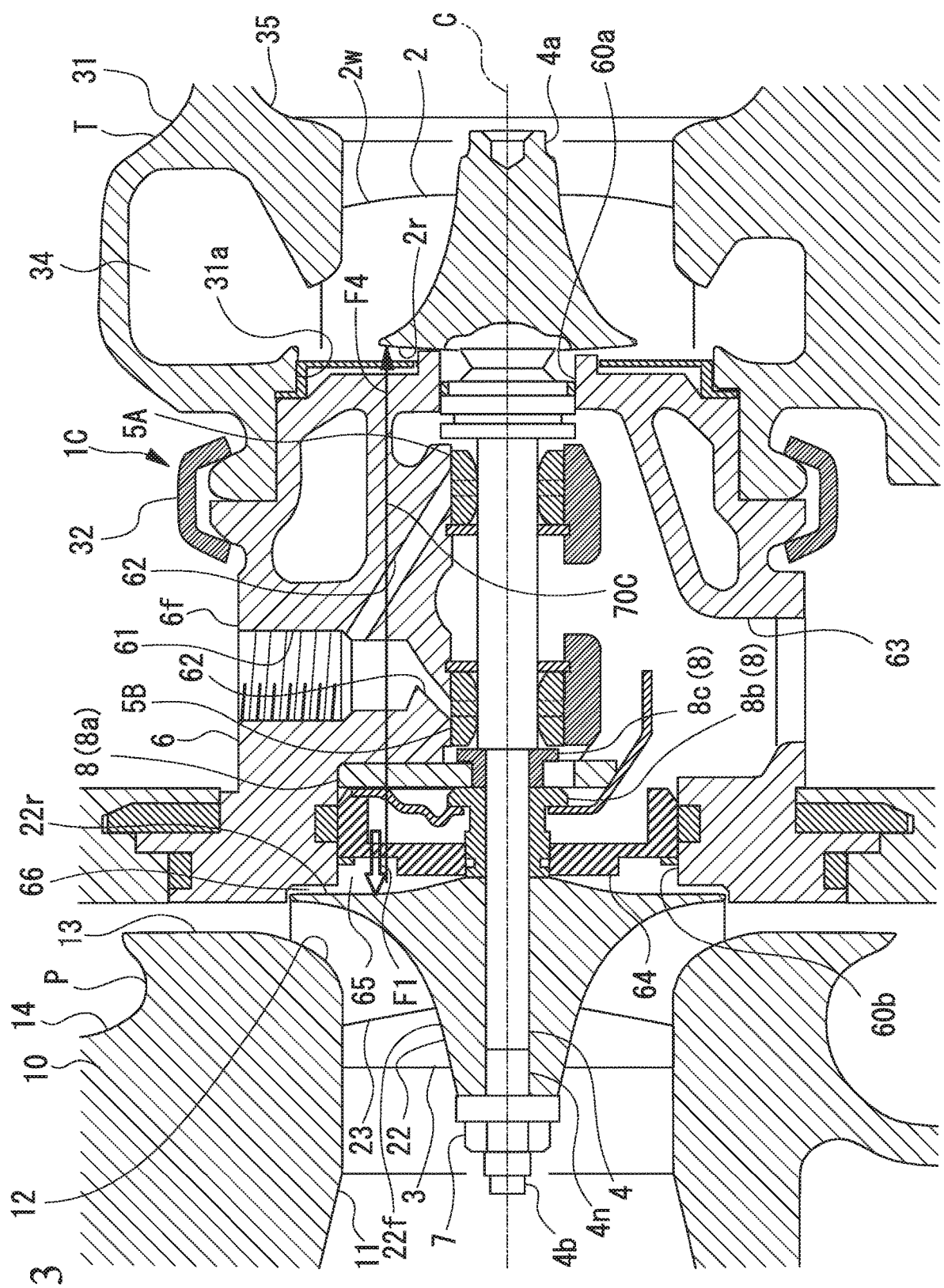
FIG. 3 is a cross-sectional view of a turbocharger according to a third embodiment of the present invention.

FIG. 3 is a cross-sectional view of the turbocharger according to the third embodiment of the present invention.

As shown in FIG. 3, in order to balance the thrust force F1 acting on the compressor wheel 3, the turbocharger 1C according to the third embodiment is provided with a fluid supply section 70C for supplying a fluid which presses the turbine wheel 2 toward the first end 4a side of the rotating shaft 4 (the right side in FIG. 1).

The fluid supply section 70C extracts the fluid from a space 65 formed between the compressor wheel 3 and the bearing housing 6 and supplies it to the back surface 2r of the turbine wheel 2 on the second end 4b side. The fluid existing in the space 65 is the compressed air compressed by the compressor wheel 3 which flows into the space 65 through the gap 66.

This fluid supply section 70C may be provided with a hole serving as a flow path of the compressed air or may be provided with a pipe or the like serving as a flow path in the bearing housing 6. The fluid supply section 70C may pass through the inside of the bearing housing 6 and at least part thereof in the longitudinal direction may be disposed to go along the lubricating oil feed path 62.

By supplying the compressed air from the space 65 to the back surface 2r of the turbine wheel 2 in the fluid supply section 70C, a pressing force F4 for pressing the turbine wheel 2 toward the first end 4a side (the right side in FIG. 1) of the rotating shaft 4 is applied to the turbine wheel 2.

In the turbocharger 1C of this embodiment, the space 65 formed between the compressor wheel 3 and the bearing housing 6, that is, the compressed air forming the thrust force F1 of the compressor wheel 3 is extracted and supplied to the back surface 2r of the turbine wheel 2. This makes it possible to press the turbine wheel 2 with the pressing force F4 in the opposite direction while reducing the thrust force F1 acting on the compressor wheel 3. Therefore, it is possible to efficiently reduce the thrust load caused by the back pressure of the compressor P. As a result, the supercharging efficiency of the turbocharger 1A can be increased.

Further, the compressed air supplied to the turbine wheel 2 by the fluid supply section 70C is lower in temperature than the exhaust gas. Therefore, by supplying the compressed air to the back surface 2r side of the turbine wheel 2, thermal damage on the members in the vicinity of the back surface 2r of the turbine wheel 2 can be minimized.

Other Embodiments

The present invention is not limited to the above-described embodiments and the design can be changed without departing from the scope of the present invention.

For example, the overall configuration of the turbochargers 1A, 1B and 1C is not limited to the configuration shown in the above embodiments.

For example, even in a variable displacement turbocharger or the like having a mechanism for adjusting the flow rate of the exhaust gas fed from the scroll flow passage to the turbine wheel, the same operational effects as those described above can be obtained by applying the fluid supply sections 70A, 70B and 70C.

INDUSTRIAL APPLICABILITY

The present invention can be applied to turbochargers. According to the present invention, the thrust load caused by the back pressure of the compressor wheel can be reduced and the supercharging efficiency can be increased.

REFERENCE SIGNS LIST 1A, 1B, 1C Turbocharger
2 Turbine wheel
2r Back surface
2w Turbine blade
3 Compressor wheel
4 Rotating shaft
4a First end
4b Second end
4n Threaded portion
5A, 5B Journal bearings (radial bearings)
6 Bearing housing
6f Outer circumferential surface
7 Nut
8 Thrust bearing
8a Bearing main body
8b Thrust sleeve
8c Thrust ring
10 Compressor casing
11 Wheel inlet flow passage
12 Wheel flow passage
12a Outermost peripheral portion
13 Diffuser
14 Scroll
22 Disk
22f Disk surface 22*r* Back surface
23 Blade
31 Turbine housing
31*a* Opening
32 Mounting fixture
33 Gas introduction port
34 Scroll flow passage
35 Exhaust portion
60*a*, 60*b* Opening
61 Oil feed pipe connection port
62 Lubricating oil feed path
63 Oil drain portion
64 Back plate
65 Space
66 Gap
70A, 70B, 70C Fluid supply section
C Center axis
F1 Thrust force
F2, F3, F4 Pressing force
P Compressor
T Turbine

The invention claimed is:

1. A turbocharger comprising: a rotating shaft which extends along a center axis; a turbine wheel which is provided on a first end side of the rotating shaft; a compressor wheel which is provided on a second end side of the rotating shaft; a bearing housing which includes a radial bearing for rotatably supporting the rotating shaft and a thrust bearing for supporting the rotating shaft in the center axis direction; a turbine housing which receives the turbine wheel; and a fluid supply section for supplying a fluid which presses the turbine wheel toward the first end side to the turbine wheel in the turbine housing, wherein the fluid supply section extracts a gas from an upstream side of the turbine wheel in a flow direction of the gas supplied to the turbine wheel, and supplies the gas to a back surface of the turbine wheel on the second end side, wherein the bearing housing has a lubricating oil feed path for supplying a lubricating oil to at least the radial bearings from an oil feed pipe connection port which extends radially inward of the bearing housing from an outer circumferential surface of the bearing housing, wherein the fluid supply section is provided directly adjacent and parallel to the oil feed pipe connection port and the lubricating oil feed path in the bearing housing, and wherein the lubricating oil is capable to being heated by the heat of the fluid supplied to the turbine wheel, such that the viscosity is capable to being lowered.

* * * * *